United States Patent [19]

Sliney, Jr.

[11] 4,449,242
[45] May 15, 1984

[54] FLEXIBLE, RESILIENT ANTI-CONTAMINATION BAFFLE

[75] Inventor: James G. Sliney, Jr., La Canada, Calif.

[73] Assignee: The United States of America as represented by the Secretary of the Air Force, Washington, D.C.

[21] Appl. No.: 413,296

[22] Filed: Aug. 31, 1982

[51] Int. Cl.³ .................. B65D 51/16; F16K 15/14
[52] U.S. Cl. .................. 383/103; 220/209; 220/373; 137/855; 137/254; 251/127
[58] Field of Search ............. 428/900, 611, 928, 591; 137/855, 856, 858, 859, 254; 251/139, 118, 127; 229/62.5, DIG. 14; 220/209, 230, 361, 373, 203, 367; 123/73; 383/66, 103

[56] References Cited

U.S. PATENT DOCUMENTS

| | | | |
|---|---|---|---|
| 1,342,216 | 6/1920 | Henig | 137/856 |
| 2,568,976 | 9/1951 | Andrews | 229/DIG. 14 |
| 3,432,087 | 3/1969 | Costello | 220/367 |
| 3,805,828 | 4/1974 | Panagrossi | 137/525.3 |
| 3,891,000 | 6/1975 | Melnick | 137/525.3 |
| 3,905,340 | 9/1975 | Boyesen | 123/73 A |
| 3,983,900 | 10/1976 | Airhart | 137/855 |
| 4,089,348 | 5/1978 | Yoshida et al. | 137/856 |
| 4,098,296 | 7/1978 | Grasso et al. | 137/855 |
| 4,122,993 | 10/1978 | Glas | 229/DIG. 14 |
| 4,193,424 | 3/1980 | Hrabel | 137/855 |
| 4,206,870 | 6/1980 | De Vries | 229/DIG. 14 |
| 4,228,770 | 10/1980 | Boyesen | 137/855 |

*Primary Examiner*—Steven M. Pollard
*Assistant Examiner*—Bryon P. Gehman
*Attorney, Agent, or Firm*—Donald J. Singer; Jacob N. Erlich

[57] ABSTRACT

A flexible, resilient anti-contamination baffle having a plurality of interleaved sheets of material. The sheets of material are secured at one end thereof to a surface adjacent an opening to be sealed and have the capability of not only substantially preventing the passage of gaseous contaminants through the opening when the regions adjacent the openings are of substantially the same pressures but also capable of allowing the rapid venting of gases from a region of higher pressure to a region of lower pressure. Additionally, the sheets of material are formed so as to provide a "breakaway capability" allowing the passing of an object through the opening without encompassing or entangling the object as it passes therethrough.

7 Claims, 10 Drawing Figures

FLEXIBLE, RESILIENT ANTI-CONTAMINATION BAFFLE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to one-way valves, and, more particularly to a flexible, resilient anti-contamination baffle which finds its greatest utility as an integral component of spacecraft package for deployment in space.

The deployment of space-related components generally require that the components be contained in a uniquely designed package for transporting into space. In many instances it is necessary to cut holes or openings in the cover or exterior of such packages in order to allow protuberances formed on the component to pass therethrough for future deployment of the component in space. Unfortunately, such holes or openings subject the interior of the package and therefore the components contained therein to contamination. This contamination can arise during ground storage, or during storage within the cargo compartment of, for example, a space shuttle in the course of prelonged spacecraft operation, the ascent phase, or the transfer orbit phase. The contamination with which the present invention concerns itself is contamination due primarily to molecular movement from one region to another.

Presently known devices which may be in the form of, for example, one-way valves, which are capable of inhibiting contamination generally lack the required mechanical flexibility necessary when utilized in conjunction with protruding components in spacecraft packages. Other devices which meet the mechanical flexibility requirement, generally fail to satisfy the contamination inhibition requirements.

Therefore, it is of extreme importance, particularly in the area of preventing contamination in space-related applications to provide an anti-contamination baffle which is capable of overcoming the contamination problems associated with space-related packages and components and yet provide effective one-way valve capability. This baffle must also allow for the rapid venting of gases in a preferred direction as well as inhibiting the flow of gaseous contaminants between two regions at low, but similar pressures. In addition, this baffle must have the further advantage of such flexibility to allow it to be used as an integral component of spacecraft protective package without causing damage to spacecraft components protruding therefrom.

SUMMARY OF THE INVENTION

The present invention overcomes the problems encountered in the past and as set forth in detail hereinabove by providing a flexible, resilient anti-contamination baffle. Although the anti-contamination baffle of this invention is primarily intended as an integral component of spacecraft protective package for space-related applications, it is also capable of providing one-way valve operation in numerous other non-space-related applications.

The flexible, resilient anti-contamination baffle of this invention provides a unique one-way valve capability. Its primary objective is to inhibit the flow of contaminant gases between regions at low, but similar pressures. In addition, the baffle possesses the mechanical flexibility and resilience to allow for rapid venting of gases in a preferred direction, a condition which is generally encountered in launching spacecraft into orbit around the earth. Even further, the flexibile, resilient anti-contamination baffle has a "breakaway capability" thereby enabling the baffle not to become entangled with extended parts or component protuberances during the deployment stage of operation.

Making up the flexible, resilient anti-contamination baffle of the present invention are a plurality of extremely thin, lightweight, flexible, resilient interleaved sheets of space-qualified material such as Teflon, Tedlar, Kaptan or Mylar. These interleaved sheets are secured at one end thereof adjacent an opening or hole formed within a package through which it is desired to prevent contaminants from passing. The construction of the present invention provides a substantially reduced effective aperture for the opening or hole and therefore greatly inhibits the flow of contaminant gas between regions adjacent opposed sides of the opening or hole.

In addition to the above beneficial results provided by the present invention, the flexible, resilient anti-contamination baffle allows for the rapid venting of gases in a preferred direction. This condition would arise, for example, during the launch and ascent phase of a spacecraft being placed into orbit. Consequently, the material making up the interleaved sheets of the baffle are not only flexible enough to yield to pressure differences and allow for the rapid venting of gases in a preferred direction, but also are made sufficiently resilient so that when the pressure in the two opposed regions approaches equilibrium, the sheets of material will return to their original position and effect a "soft seal".

As stated above, the sheets of material making up the anti-contamination baffle of this invention must also be so designed so as to possess a "breakaway capability" thereby allowing the sheets to slide or extend over protuberances without snagging or in any way interfering with such protuberances during the deployment stage of operation. In this regard the anti-contamination baffle of this invention possesses a loose adhesive capability which is sufficient to "soft seal" the opening or hole before deployment but is capable of moving out of position in order to facilitate a smooth execution of component deployment. An example of such type of loose adhesive could be an electrostatic type of adhesion, a mechanical, magnetic or electric "zipper" system.

In addition, the present invention has the capability of molding itself about any protuberance during the "soft seal" position. In this manner contaminants can be prevented from passing through the opening and yet allow for the partial protrusion of components to pass therethrough prior to deployment.

It is therefore an object of this invention to provide a flexible, resilient anti-contamination baffle which provids an effective one-way valve capability.

It is another object of this invention to provide a flexible, resilient anti-contamination baffle which is capable of inhibiting the flow of gaseous contaminants between regions of low, but similar pressures.

It is still another object of this invention to provide a flexible, resilient anti-contamination baffle which possesses the mechanical flexibility to allow for rapid venting of gases from one region to another in a preferred direction.

It is still a further object of this invention to provide a flexible, resilient anti-contamination baffle which possesses a "breakaway capability" so that it does not become entangled with extended parts or protuberances as they pass therethrough during the deployment operation.

It is still a further object of this invention to provide a flexible, resilient anti-contamination baffle which has the capability of molding to adjacent, uniquely shaped components.

It is still a further object of this invention to provide a flexible, resilient anti-contamination baffle which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
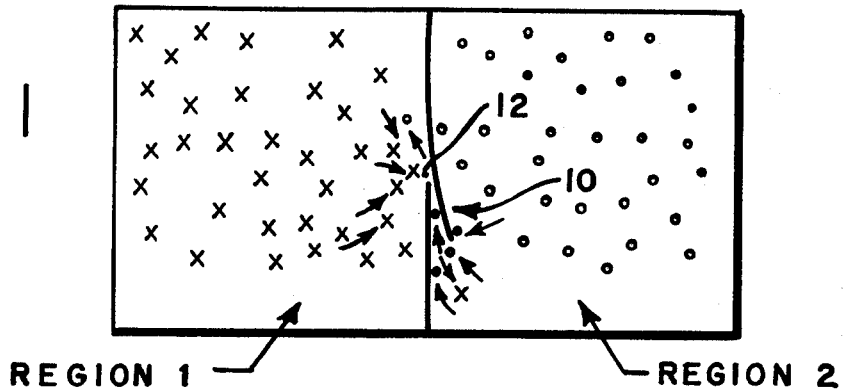
FIG. 1 is a schematic representation of a pair of opposed regions containing different types of molecules (gaseous contaminants) and showing the relationship of the flexible, resilient anti-contamination baffle of the present invention thereto.

Reference is now made to FIG. 1 of the drawing in order to better understand the concepts involved in providing anti-contamination baffle 10 of this invention between adjacent regions 1 and 2 in which an aperture 12 is formed between the regions. It is desirable under ordinary circumstances to prevent the passage of molecules from one region to the other. When the pressure in one region (region 1) becomes greater than the pressure in another region (region 2) it is then desirable to rapidly vent the molecules from region 1 to region 2. Such to condition may arise, for example, during space-related applications described hereinbelow. Although the primary function of the present invention is for use during space related applications, it should be realized that this invention is not limited to such applications but is also extremely effective in any use in which the one-way valve capability of the present invention is desired.

The primary purpose of the flexible, resilient anti-contamination baffle 10 of the present invention resides in its ability to inhibit the flow of gaseous contaminants between regions (regions 1 and 2 shown in FIG. 1) of low, but similar pressures, by reducing the effective aperture 12 and extending the pathlengths between the two adjacent regions 1 and 2. In so doing, contaminant molecules located within regions 1 and 2 must first locate the small effective aperture 12 created by the interleaved sheets 14 of baffle 10 (described in detail hereinbelow) of this invention before they are able to pass between regions 1 and 2 as shown in FIG. 1 of the drawing.

Figure 2:
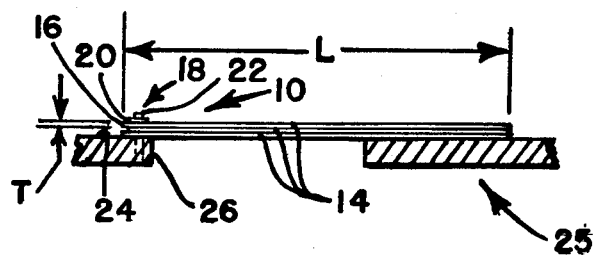
FIG. 2 is a side elevational view, shown partly in cross section, of the flexible, resilient anti-contamination baffle of this invention in its closed position.
Figure 3:
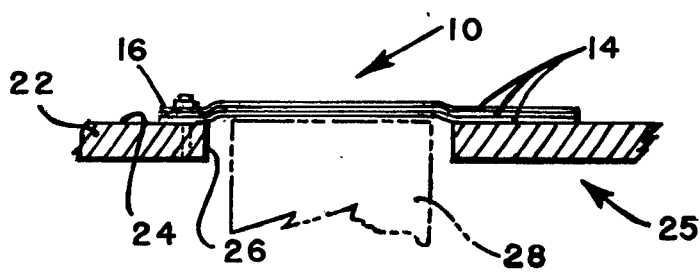
FIG. 3 is a side elevational view, shown partly in cross section, of the flexible anti-contamination baffle of this invention shown in its closed position and conforming to an adjacent protruding component.
Figure 4:
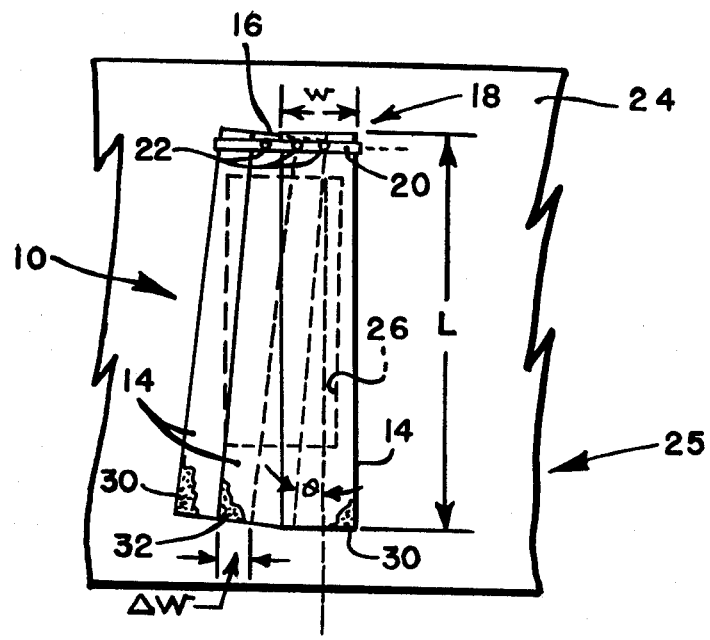
FIG. 4 is a plan view of the flexible, resilient anti-contamination baffle of the present invention.
Figure 5:
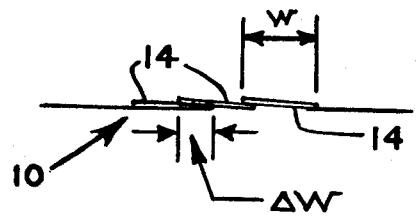
FIG. 5 is an end view of the flexible, resilient anti-contamination baffle of this invention shown in the closed position.

As shown more clearly in FIGS. 2–4 of the drawing, anti-contamination baffle 10 of the present invention is made up of a plurality of adjacent interleaved sheets 14 made of a preferably space qualified material of extremely thin thickness, T. This thickness, in most instances, is of a "film" thickness of approximately 0.5 mm. One end 16 of each of the sheets 14 is fixedly secured by any suitable clamping arrangement 18 to an adjacent surface 24. Clamping arrangement 18 may be made up of, for example, any conventional plate 20 and suitable fasteners 22.

As shown in FIGS. 2–4 of the drawing, baffle 10 is utilized to cover or seal an opening 26 formed within surface 24 of, for example, a package 25 a portion of which is shown in FIGS. 2–4 and 6 of the drawing utilized to house a component 28 (shown in phantom in FIG. 3) for a spacecraft oriented mission or the like. Although three such sheets 14 are shown in the drawing, baffle 10 of the present invention is not limited to three sheets 14 but may be made of any number of sheets 14 sufficient to cover opening 26 in a fanned fashion as shown in FIG. 4. As clearly shown in FIG. 4, one end of each of the sheets 14 is fixedly secured to surface 24 adjacent one side of opening 26 while the other end of each of sheets 14 lay unattached to surface 24 adjacent the opposed side of opening 26. In this manner, the opening 14 is substantially sealed to prevent gaseous contaminants from passing therethrough in the manner indicated in FIG. 1 of the drawing.

Figure 9A:
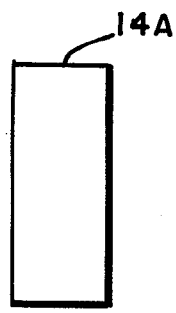
FIGS. 9B and C and 10A, B, C and D are plan views of a variety of configurations which may make up the sheets of flexible, resilient material of the anti-contamination baffle of this invention.
Figure 9B:
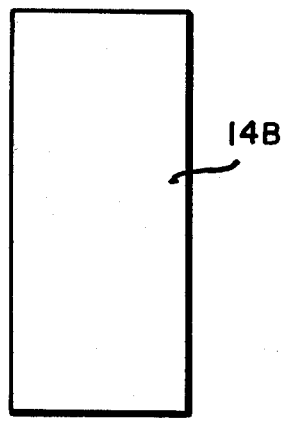
Figure 9C:
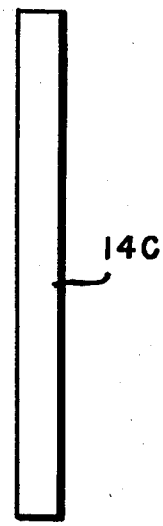
Figure 10A:
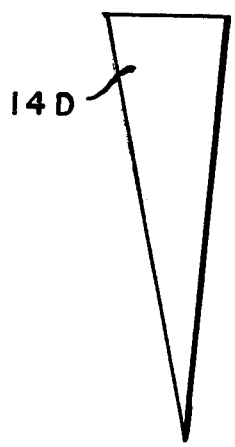
Figure 10B:
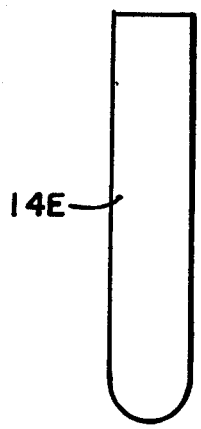
Figure 10C:
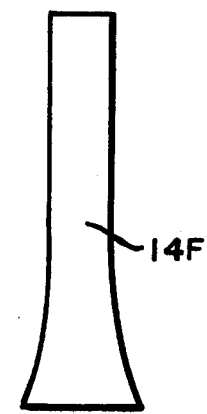
Figure 10D:
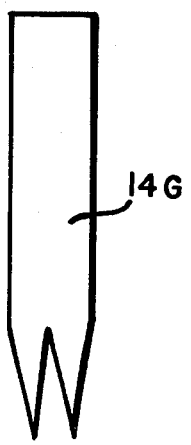

In order to achieve the desired small effective aperture 12 as mentioned hereinabove and the long effective pathlength, the length, L, of sheets 14 as well as their width, W, overlap width, $\Delta W$, and slant angle, $\theta$, are varied according to the configuration and size of opening 26 which needs to be sealed. Although sheets 14 are shown to be of rectangular configuration in FIG. 4 of the drawing, sheets 14 may be cut in the shape of other geometries or configurations more suitable to sealing opening 14. These types of configurations are clearly illustrated by sheets 14 A–G in FIGS. 9A, B and C and 10A, B, C and D of the drawing.

In addition to variations in the shape of sheets 14, variations in the material utilized for the fabrication of the sheets 14 fall within the inventive concept set forth herein. For example, sheets 14 must be extremely thin and therefore may be formed of such material as Teflon, Tedlar, Kaptan or Mylar.

In order to maintain the "soft seal" over opening 26, it is necessary to loosely adhere the individual sheets 14 to one another. This loose adherence may be accomplished by either a magnetic, electrostatic or mechanical method. For example, embedding alternate sheets 14 with magnetized material 30 and other sheets 14 with iron or other suitable magnetic material 32 as illustrated in FIG. 4 accomplishes the magnetic loose adherence between sheets 14. For the electrostatic method of loose adherence, alternately charged sheets 14 may be required. In all cases, however, the adhesion must be such that it can not only provide a sealing of opening 26 but also provide the "breakaway capability" required for space-related applications as well as other applications. In other words, under circumstances in which it is necessary to deploy component 28 or a protruding limb through opening 26, sheets 14 must be able to be quickly displaced from their "soft seal" position without damaging either baffle 10 of component 28.

Figure 6:
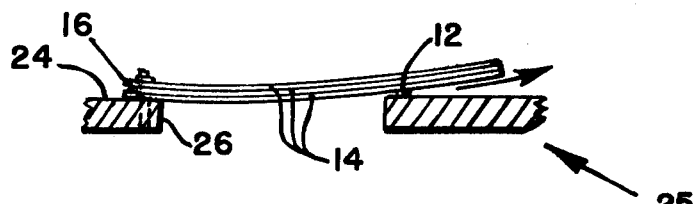
FIG. 6 is a side elevational view, shown partly in cross section, of the flexible anti-contamination baffle of the present invention shown in the open position.
Figure 7:
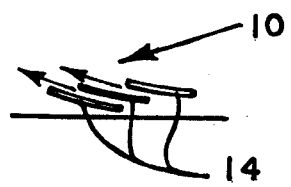
FIG. 7 is an end view of the flexible, resilient anti-contamination baffle of the present invention shown in its open position.

Another major requirement of the present invention involves the mechanical flexibility needed to allow for the rapid venting of gases in a preferred direction. As an example, for space-related applications, this situation would occur during the launch and ascent phase of a spacecraft being placed into orbit. The sheets 14 of baffle 10 must not only be flexible enough to yield to the pressure differences on opposite sides thereof and allow for the rapid venting of gases in the preferred direction, but they must also be made sufficiently resilient, so that when the pressure in the two opposite regions approaches equilibrium, the sheets 14 will return to their original position and effect the "soft seal". This concept is illustrated in FIGS. 6 and 7 of the drawing which show sheets 14 being displaced from their "soft seal" position to allow the venting of gases not only through the small effective aperture 12 formed between sheets 14 and surface 24 as indicated by the arrow in FIG. 6, but also between adjacent sheets 14 as indicated by the arrows in FIG. 7.

Figure 8:
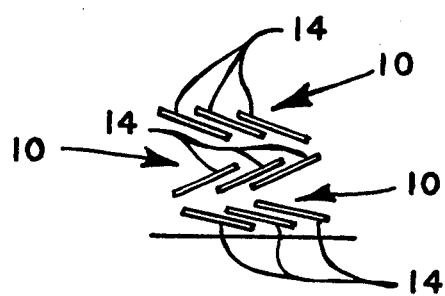
FIG. 8 is an end view of a plurality of sets of the flexible, resilient anti-contamination baffle of the present invention shown in the open position.

Further, as illustrated in FIG. 8 of the drawing, a plurality of sets of the flexible, resilient anti-contamination baffles 10 of the present invention can be utilized together in an overlaying configuration to even further substantially reduce the small effective aperture and increase the effectiveness of the pathlengths in order to substantially increase the inhibition of flow of gaseous contaminants between adjacent regions.

In conclusion, the flexible, resilient anti-contamination baffle 10 of the present invention employs sheets 14 which allow for the creation of a "soft seal" as well as permits the preferential venting of gases in a one-way valve capability. Additionally, this invention also provides a mechanical flexibility known as the "breakaway capability" which is particularly useful for, but not limited to, spacecraft component deployment operations. In addition to all of the above advantages of the invention, baffle 10 is able to conform in its "soft seal" position to any object or component which partially protrudes through opening 26 during the "soft seal" position as shown in FIG. 3.

Although this invention has been described with reference to a particular embodiment, it will be understood that this invention is also capable of further and other embodiments within the spirit and scope of the appended claims.

I claim:

1. A package adapted to house a component therein for use in space-related applications comprising:
   a surface on said package, said surface having an opening therein;
   sealing means fixedly secured at one end thereof to said surface adjacent said opening for covering said opening when pressures on opposite sides of said opening are substantially equal and uncovering said opening by moving in a predetermined direction when said pressure on opposite sides of said opening are unequal or when an object is forced against said sealing means, said sealing means being formed of a plurality of overlapping sheets of material, said sheets of material being extremely thin and both flexible and resilient, and said sheets of material being angularly displaced on one another in a fanned fashion in said overlapping position; and
   means operably associated with said sheets of material for providing loose adherence between said sheets of material while said sheets are covering said opening and for allowing said sheets to be released from one another while uncovering said opening;
   whereby contaminants are prevented from passsing through said opening when said sheets are covering said opening, and molecules can pass in said predetermined direction when said sheets are uncovering said opening.

2. An anti-contamination baffle for use in selectively sealing an opening within a surface comprising:
   sealing means fixedly means secured at one end thereof to said surface adjacent said opening for covering said opening when pressures on opposite sides of said opening are substantially equal and uncovering said opening by moving in a predetermined direction when said pressures on opposite sides of said opening are unequal or when an object is forced against said sealing means, said sealing means being formed of a plurality of overlapping sheets of material, said sheets of material being extremely thin and both flexible and resilient, and each of said sheets of material being angularly displaced from one another in a fanned fashion in said overlapping position; and
   means operably associated with said sheets of material for providing loose adherence between said sheets of material while said sheets are covering said opening and for allowing said sheets to be released from one another while uncovering said opening;
   whereby contaminants are prevented from passing through said opening when said sheets are covering said opening, and molecules can pass in said predetermined direction when said sheets an uncovering said opening.

3. An anti-contamination baffle as defined in claim 2 wherein each of said sheets of material has a substantial length compared to the width thereof.

4. An anti-contamination baffle as defined in claim 3 further comprising a plurality of sealing means provided in stacked relationship to one another.

5. An anti-contamination baffle as defined in claim 4 wherein said means for providing loose adherence to said sheets comprises minute particles of magnetized material and magnetic material in alternate sheets of material, respectively.

6. An anti-contamination baffle as defined in claim 2 further comprising a plurality of sealing means provided in stacked relationship to one another.

7. An anti-contamination baffle as defined in claim 2 wherein said means for providing loose adherence to said sheets comprises minute particles of magnetized material and magnetic material in alternate sheets of material, respectively.

* * * * *